(12) United States Patent
Glickman

(10) Patent No.: US 7,764,832 B2
(45) Date of Patent: Jul. 27, 2010

(54) SYSTEM AND METHOD FOR PROCESSING IMAGE DATA FOR COLOR SPACE CONVERSION

(75) Inventor: Jeff Glickman, Las Vegas, NV (US)

(73) Assignee: Seiko Epson Corporation, Shinjuku-ku, Tokyo (JP)

( * ) Notice: Subject to any disclaimer, the term of this patent is extended or adjusted under 35 U.S.C. 154(b) by 1124 days.

(21) Appl. No.: 11/012,627

(22) Filed: Dec. 14, 2004

(65) Prior Publication Data

US 2005/0128499 A1 Jun. 16, 2005

Related U.S. Application Data

(60) Provisional application No. 60/530,470, filed on Dec. 16, 2003.

(51) Int. Cl.
  G06K 9/00 (2006.01)
  G06K 9/36 (2006.01)
  G06K 15/00 (2006.01)
  H04N 1/40 (2006.01)

(52) U.S. Cl. .................. 382/166; 382/162; 358/3.23

(58) Field of Classification Search .............. 382/162, 382/166; 358/3.23; 345/590
  See application file for complete search history.

(56) References Cited

U.S. PATENT DOCUMENTS

| | | | | |
|---|---|---|---|---|
| 5,572,632 | A | | 11/1996 | Laumeyer et al. |
| 5,579,031 | A | * | 11/1996 | Liang .......................... 345/604 |
| 5,828,470 | A | * | 10/1998 | Maeda et al. ................ 358/504 |
| 5,933,253 | A | * | 8/1999 | Ito et al. ...................... 358/500 |
| 6,072,464 | A | * | 6/2000 | Ozeki .......................... 345/603 |
| 6,072,901 | A | * | 6/2000 | Balonon-Rosen et al. ... 382/167 |
| 6,108,442 | A | * | 8/2000 | Edge et al. ................... 382/167 |
| 6,204,939 | B1 | | 3/2001 | Lin et al. |
| 6,349,146 | B2 | * | 2/2002 | Roetling ...................... 382/162 |
| 6,388,674 | B1 | * | 5/2002 | Ito et al. ...................... 345/590 |
| 6,486,889 | B1 | | 11/2002 | Meyers et al. |
| 6,633,667 | B1 | | 10/2003 | Matsuoka |
| 6,642,931 | B1 | * | 11/2003 | Haikin et al. ................ 345/601 |
| 6,678,406 | B1 | * | 1/2004 | Mojsilovic et al. .......... 382/162 |
| 6,833,937 | B1 | * | 12/2004 | Cholewo ..................... 358/518 |
| 6,860,609 | B2 | | 3/2005 | Olson et al. |
| 7,268,753 | B2 | * | 9/2007 | Lee et al. ....................... 345/77 |
| 7,369,699 | B1 | * | 5/2008 | Christie ....................... 382/163 |
| 7,397,483 | B1 | * | 7/2008 | Sugiura ....................... 345/660 |

(Continued)

OTHER PUBLICATIONS

Babel et al., *Lossless and lossy minimal redundancy pyramidal decomposition for scalable image compression technique*, UMR CNRS 6164 IETR Groupe Image ICASSP 2003, pp. 249-252.

(Continued)

*Primary Examiner*—Samir A Ahmed
*Assistant Examiner*—Li Liu
(74) *Attorney, Agent, or Firm*—Townsend and Townsend and Crew, LLP

(57) ABSTRACT

A method of processing image data is disclosed, wherein the method includes receiving a set of image data values in a device-dependent first color space, comparing the values in the first color space to a look-up table having entries correlating the values in the first color space to integer values in a device-independent second color space, locating in the look-up table the values in the second color space corresponding to the values in the first color space, and converting the values in the first color space to the values in the second color space.

32 Claims, 5 Drawing Sheets

U.S. PATENT DOCUMENTS

| | | |
|---|---|---|
| 2001/0033404 A1 | 10/2001 | Escobosa et al. |
| 2002/0012433 A1 | 1/2002 | Haverinen et al. |
| 2002/0085015 A1 | 7/2002 | Wilt et al. |
| 2003/0017846 A1 | 1/2003 | Estevez et al. |

OTHER PUBLICATIONS

You et al, *Pyramidal image compression using anisotropic and error-corrected interpolation*, Department of Electrical Engineering, University of Minnesota.

Pettelkau, Jeff. Toshiba TDP-SW20 Wireless DLP Projector. Oct. 2004 [retrieved on Mar. 15, 2007]. Retrieved from the Internet: <URL: http://www.jiwire.com/toshiba-TDP-SW20-wireless-projector-photo-image-gallery.htm>.

Office Action for Chinese Patent Application No. 200480041208.2. State Intellectual Property Office (China). Aug. 4, 2008.

You et al, *Pyramidal image compression using anisotropic and error-corrected interpolation*, Department of Electrical Engineering, University of Minnesota, 1996 IEEE ICASSP—vol. 04, pp. 1946-1949.

\* cited by examiner

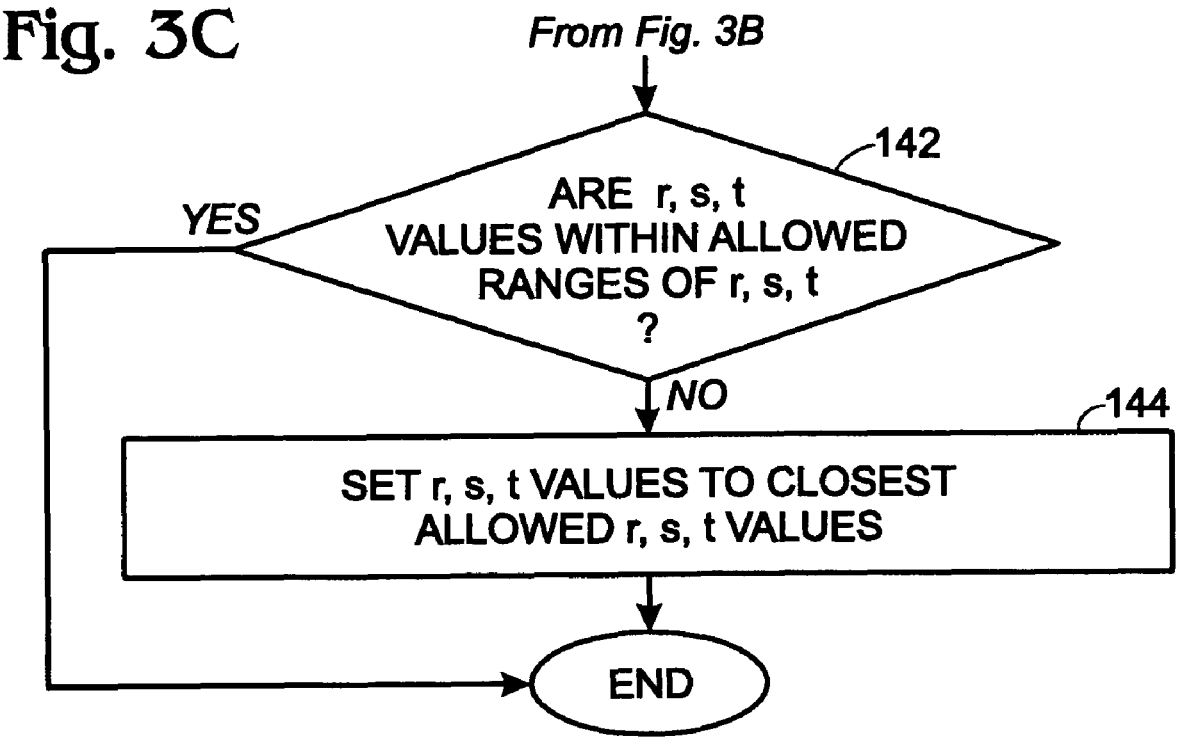

SYSTEM AND METHOD FOR PROCESSING IMAGE DATA FOR COLOR SPACE CONVERSION

CROSS-REFERENCE TO RELATED APPLICATION

The present application claims priority from U.S. Provisional Patent Application Ser. No. 60/530,470 filed Dec. 16, 2003, hereby incorporated by reference in its entirety for all purposes.

TECHNICAL FIELD

The present disclosure relates generally to apparatus, systems and methods for processing image data, and more specifically, to apparatus, systems and methods for transmitting colored image data.

BRIEF DESCRIPTION OF THE DRAWINGS

The disclosure is illustrated by way of example and not by way of limitation in the figures of the accompanying drawings, in which the like references indicate similar elements and in which:

FIG. 3C is a third portion of the flow diagram of FIGS. 3A and 3B.

DETAILED DESCRIPTION

As background, many different color spaces are known. Generally, a color space is a system of describing an appearance of a color as a set of coordinates in a space defined by axes representing various characteristics of colors. For example, a color in the red-green-blue ("RGB") color space is defined as a set of coordinates locating the color in a space demarked by orthogonal red, green and blue axes.

Different color spaces may be used for different applications. As an example, RGB color space is typically used for monitors and other devices in which white is created by adding colors together, while the cyan-magenta-yellow-black ("CMYK") color space is used for printing and other processes in which white is created by subtracting colors.

The RGB and CMYK color spaces are examples of device-dependent color spaces. A color produced by a selected set of coordinates in either of these color spaces is dependent upon characteristics of the output device. Other color spaces are device-independent. Device-independent color spaces are meant to represent colors as they actually appear to the human eye. An example of a device-independent color space is the CIE L*a*b* color space. This color space is perceptually linear, which means that colors separated by perceptually equivalent amounts are located approximately equal distances apart in the color space.

Device-independent color spaces such as the CIE L*a*b* color space typically have a broader range of colors (or "gamut") than device-dependent color spaces, and thus provide an intermediate color space for translating colors between many different device-specific color spaces.

However, known device-independent color spaces may not be suitable for some types of image processing. For example, the transmission of some types of image data may require image data to be compressed in real time before transmission. CIE XYZ and CIE L*a*b* color space coordinates are real numbers, and are, thus, typically defined as floating point numbers in computer programs. Calculations with floating point numbers may consume significant amounts of computing resources relative to calculations with other number formats. This may cause problems with the real-time compression and transmission of some types of image data.

Figure 1:
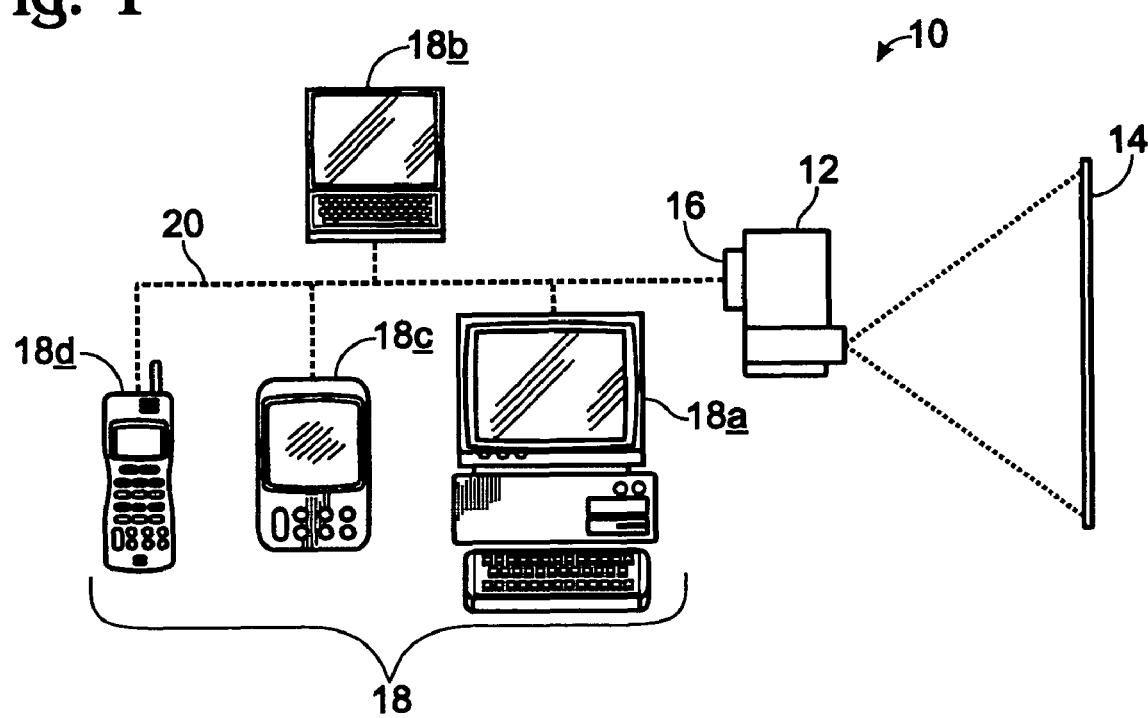
FIG. 1 is a schematic view of an image data processing system according to a first embodiment of the present invention.

FIG. 1 shows, generally at 10, a schematic depiction of an image processing system according to a first embodiment of the present invention. Image processing system 10 includes an image display device 12 configured to display an image on a viewing surface 14. Image display device 12 may be any suitable type of display device, including, but not limited to, projection devices. Other non-limiting examples include, but are not limited to, liquid crystal display (LCD), digital light processing (DLP) projectors, front display devices, front projection devices, rear display devices, read projection devices, televisions, etc. Additional non-limiting examples include, but are not limited to, television systems, computer monitors, etc.

Image processing system 10 also includes an image-rendering device 16 associated with image display device 12, and one or more image sources 18 in electrical communication with image-rendering device 16. Image-rendering device 16 is configured to receive image data transmitted by image sources 18, and to render the received image data for display by image display device 12. Image-rendering device 16 may be integrated into image display device 12, or may be provided as a separate component that is connectable to the image display device. An example of a suitable image-rendering device is disclosed in U.S. patent application Ser. No. 10/453,905, filed on Jun. 2, 2003, which is hereby incorporated by reference.

Image sources 18 may include any suitable device that is capable of providing image data to image-rendering device 16. Examples include, but are not limited to, desktop computers and/or servers 18a, laptop computers 18b, personal digital assistants (PDAs) 18c, mobile telephones 18d, etc. Furthermore, image sources 18 may communicate electrically with image-rendering device 16 in any suitable manner. In the depicted embodiment, each image source 18 communicates electrically with image-rendering device 16 over a wireless network 20. However, image sources 18 may also communicate with image-rendering device 16 over a wired network, or over a wireless or wired direct connection.

Image sources 18 may be configured to provide any suitable type of image data to image-rendering device 16, for example, JPEG, MPEG and other pre-compressed files. The term "pre-compressed" refers to the fact that files in these formats are generally not compressed from raw image files in real-time for immediate transmission, but rather are compressed at some earlier time and stored on image sources 18. This is at least partially because the JPEG and MPEG compression algorithms are computationally intensive compared to the JPEG and MPEG decompression algorithms, and may be too slow for real-time compression and transmission.

Alternatively or additionally, image sources 18 may be configured to generate raw data files from images displayed on a screen of the image source, and then to compress the files using a fast compression technique, such as an LZO compression technique, for transmission to image rendering device 16 in real-time. This allows any image displayed on a screen of an image source 18 (or any raw data file on an image source 18) to be transmitted to and displayed by image display device 12.

Typically, raw image data files generated by an image source 18 are generated in whatever color space is utilized by the image source. For example, where the image source is a laptop or desktop computer, the raw image data files may be generated in an RGB color space. However, as is well known in the image processing arts, the color characteristics of image sources 18 may not match the color characteristics of image display device 12. Thus, the image sources 18 may be configured to convert the raw image data to a device-independent color space before compressing and transmitting the data to image-rendering device 16.

Converting raw image data to a device-independent color space may facilitates the transmission of image data between image sources 18 and image-rendering device 16, but may also present various difficulties. For example, the transmission of video data, such as data from a digital video disk (DVD), may require high-resolution image frames to be transformed into a device-independent color space, compressed and transmitted at a rate of 60 frames per second. However, coordinates in device-independent color space, such as the CIE L*a*b* color space, are typically real numbers expressed as floating point values. Calculations with floating point values may consume more computing resources than calculations with numbers in other formats, such as integers, and may slow the compression and transmission of image data to the point that real-time transmission is not possible. Therefore, to help lessen the amount of computing resources needed to compress and process the raw image data, image sources 18 may convert the image data to a less computationally-intensive color space before performing any compression or other processing steps.

Figure 2:
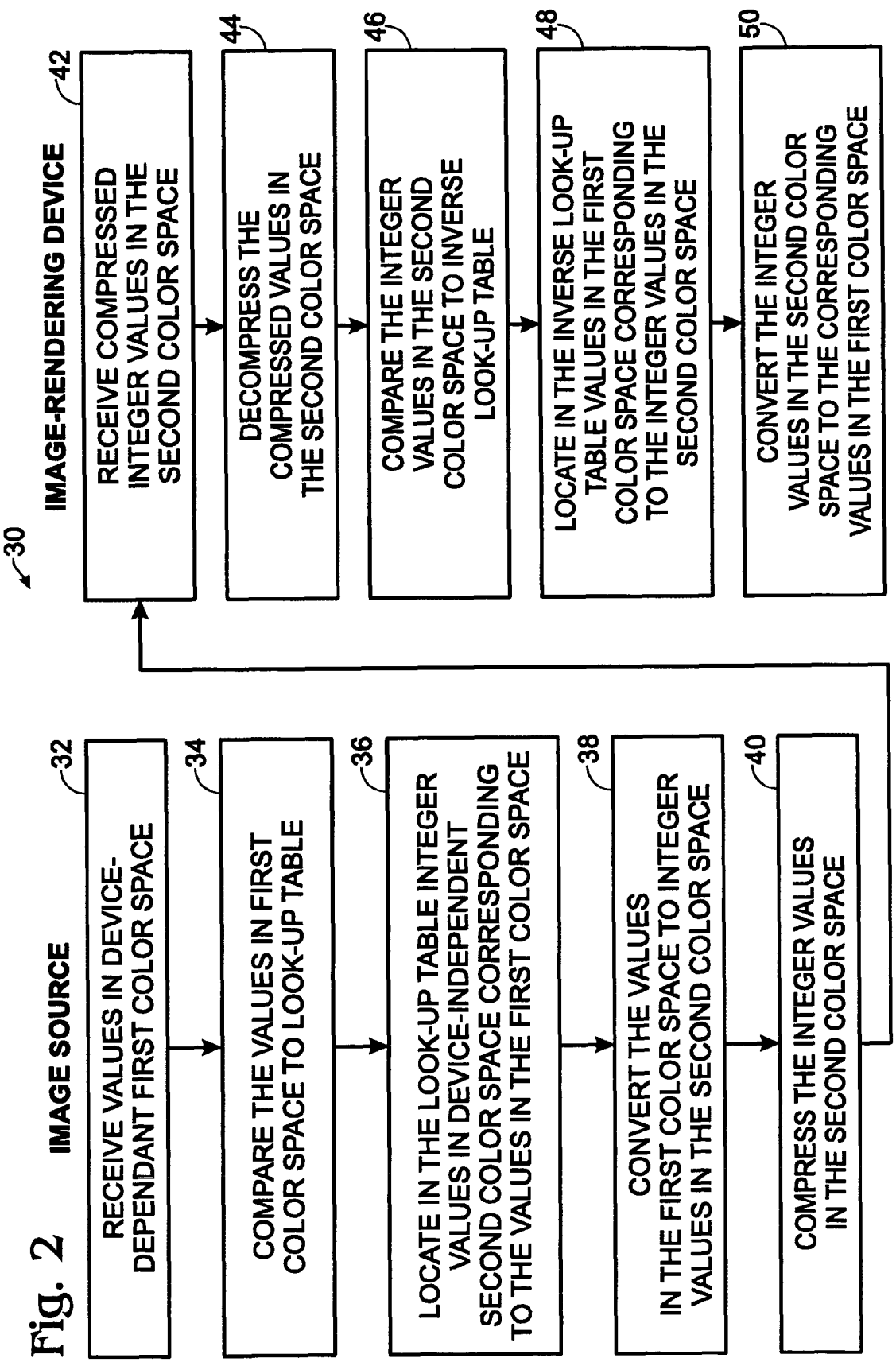
FIG. 2 is a flow diagram of a method of processing image data according to another embodiment of the present invention.

FIG. 2 shows, generally at 30, a first embodiment of a method of processing image data according to the present invention. The depicted method shows the processing of image data in the context of the generation of raw data files from an image displayed on a screen of an image source 18. However, it will be appreciated that the methods disclosed herein may find use in a wide variety of applications.

Referring to FIG. 2, an image source 18 initially generates, at 32, a raw image data file from an image appearing on the screen of the image source. The raw image data file typically represents the image as values representing color space coordinates in a first, device-dependent color space. Next, the values in the first, device dependent color space are compared, at 34, to a look-up table stored in memory on (or associated with) image source 18. The look-up table includes a plurality of values in a second, device-independent color space correlated to values in the first, device dependent color space. The values in the second, device-independent color space are represented as integers in the look-up table.

Next, values in the second color space that correspond to the values in the first color space are located, at 36, in the look-up table. After locating the integer values in the device-independent second color space that correspond to the values in the device-dependent first color space, the values in the first color space are converted, at 38, to the corresponding integer values in the device-independent second color space. After converting the values to the second color space at 38, the image data may be compressed at 40 for transmission. The use of integer values in the device-independent second color space may allow compression (and other calculations) to be performed more quickly and with less use of computing resources than the use of floating point numbers, and thus may help to speed up compression and transmission of image data to enable the real-time compression and transmission of raw image data, such as video data.

FIG. 2 also shows the decompression and processing of the compressed integer values in the second color space. First, image-rendering device 16 receives the compressed integer values in the second, device-independent color space at 42, and then decompresses the values at 44. The decompressed values in the second color space are compared, at 46, to an inverse look-up table stored in memory on image-rendering device 16, and corresponding values in the first, device-dependent are located at 48. Next, at 50, the integer values in the second color space are transformed back to the first color space for further processing and eventual display by image display device 12. While method 30 is shown in the context of an image display device 12 and image sources 18 that utilize the same device-dependent color space, it will be appreciated that image source 18 and image display device 12 may utilize different color spaces, and image-rendering device 16 may be configured to convert the decompressed second color space values to any suitable color space.

The use of a look-up table to aid in the conversion of values in the device-dependent first color space to integer values in the device-independent second color space allows the conversion to be performed in a simple manner. The look-up table and the inverse look-up table each may be calculated only once, and then may be loaded directly into memory on any number of image sources 18 and image-rendering devices 16. Alternatively, the look-up table and inverse look-up table may be constructed by software or firmware on image sources 18 and image-rendering device 16, respectively.

Figure 3A:
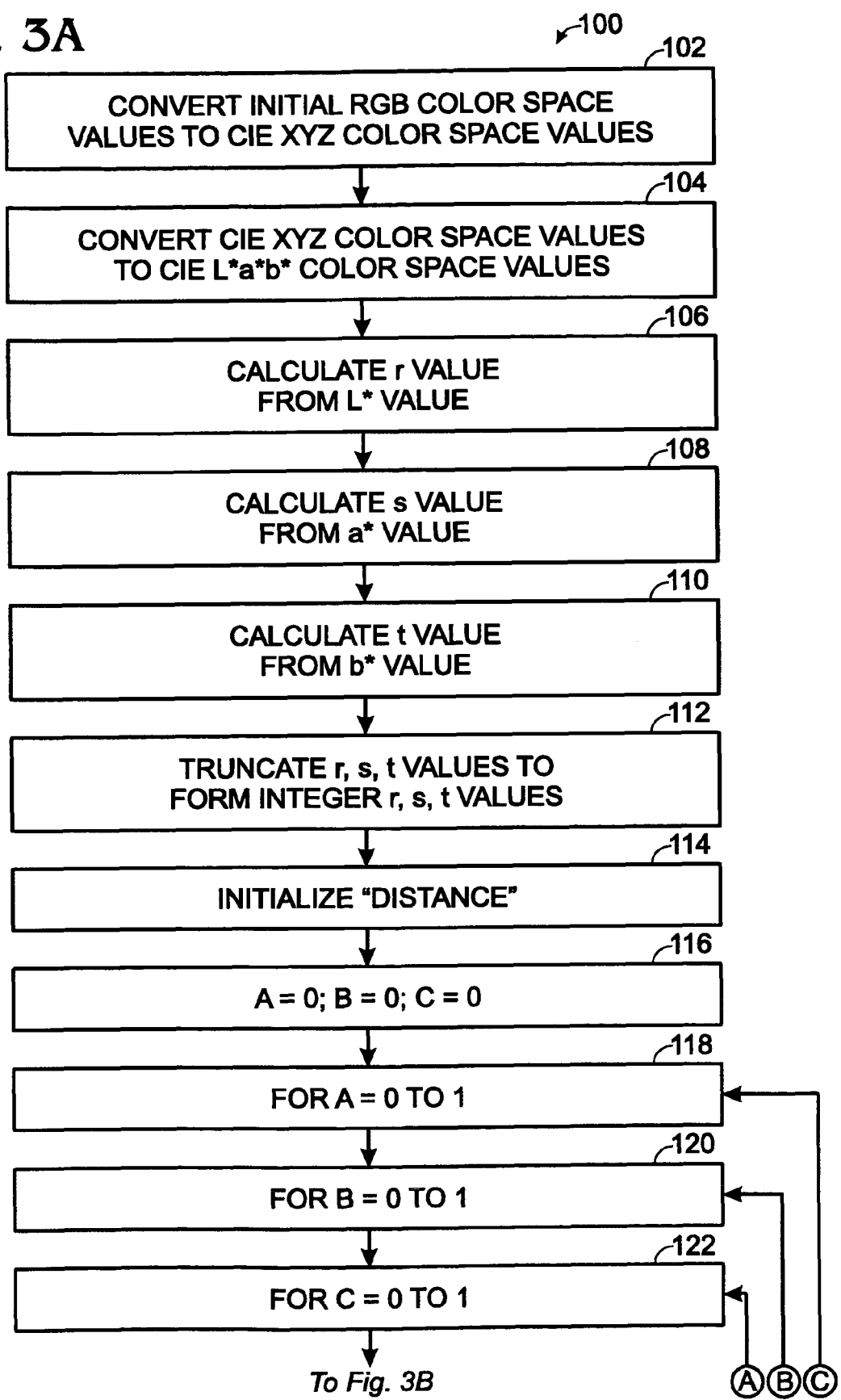
FIG. 3A is a first portion of a flow diagram of a method of generating a look-up table entry correlating a set of RBG color space coordinates to a set of device independent, perceptually linear color space coordinates according to another embodiment of the present invention.
Figure 3B:
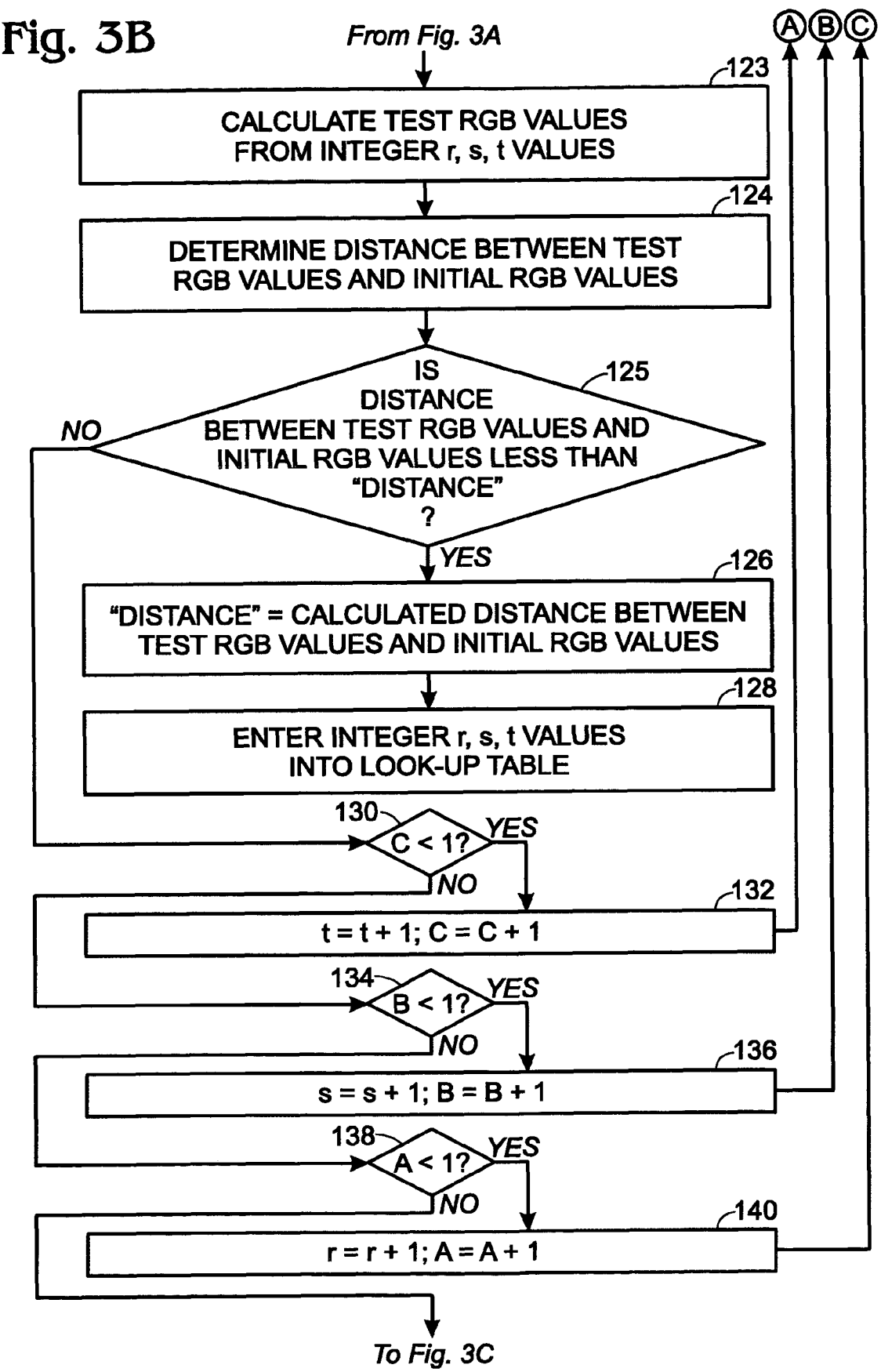
FIG. 3B is a second portion of the flow diagram of FIG. 3A.

FIGS. 3A-3C show, generally at 100, an exemplary embodiment of a suitable method to calculate values for populating a look-up table having values in the first, device-dependent color space, such as an RGB color space, correlated to integer values in the second, device-independent color space. Method 100 calculates a single set of values in the second color space from a single set of values in a first color space, and may be repeated for all desired set of values in the first color space to construct the full look-up table.

Method 100 first includes converting, at 102, initial RGB color space values to intermediate values in the device independent CIE XYZ color space, and then, at 104, converting the CIE XYZ color space values to intermediate values in the perceptually linear CIE L*a*b* color space values. While the depicted embodiment utilizes the CIE XYZ and L*a*b* color spaces as intermediate color space, it will be appreciated that any other suitable perceptually linear, device-independent color space, such as the CIE L*u*v* color space, may be used as an intermediate color space where appropriate.

Next, the CIE L*a*b* color space values are converted to floating point values in the second, device-independent color space described above in the context of FIG. 2. This color space is a derivative of the CIE L*a*b* color space, and includes values corresponding to each of the L*, a* and b* values in particular, the new, device-independent color space includes an r value corresponding to the CIE L* value, an s value corresponding to the CIE a* value, and a t value corresponding to the CIE b* value.

The r, s and t values of the second, device-independent color space may be calculated in any desired order. In the depicted embodiment, the r value is calculated at 106, the s value is calculated at 108, and the t value is calculated at 110.

The equations for calculating the r, s, and t values from CIE L*, a* and b* values are as follows:

$$r = (L^* - L^*_{min})(r_{max}/(L^*_{max} - L^*_{min})) \quad (1)$$

$$s = (a^* - a^*_{min})(s_{max}/(a^*_{max} - a^*_{min})) \quad (2)$$

$$t = (b^* - b^*_{min})(t_{max}/(b^*_{max} - b^*_{min})) \quad (3)$$

These equations offset L*, a* and b* values by subtracting minimum L*, a* and b* values from actual L*, a* and b* values, and then scale the L*, a* and b* values to form floating point r, s and t values. Offsetting the L*, a* and b* values helps to eliminate any negative numbers. Scaling the L*, a* and b* values ensures that the entire range of L*, a* and b* values fully occupy all possible integers in a desired output range.

In general, the number n of possible integers that can be expressed by a binary number of length b is $n = 2^b$. In the CIE L*a*b* color space, the L* value has a range from 0 to 100, and the a* and b* values each have a range from −128 to 127. Where it is desired to have five-bit (b=5) or six-bit (b=6) r, s and t values, it is not possible to express each possible integer within the L*, a* and b* ranges as a unique five- or six-bit value, as there are only $2^5$=thirty-two possible five-bit binary integers, and $2^6$=sixty-four possible six bit integers. Scaling the L*, a* and b* values to form the r, s and t values allows the entire range of values to be expressed as five- or six-bit integers.

Likewise, where it is desired to have eight-bit r, s and t values, there are $2^b$=256 possible integers for each of these values. Because L* has a range of 0-100, there are many more possible eight-bit integers than integers within the range of possible L* values. Rather than leave over half of the possible integers unassigned, equation (1) scales the r value to utilize the full range of eight-bit integers.

Each of the quantities in equations (1)-(3) denoted by either "max" or "min" in subscript may be either the theoretical maximum and minimum values of the full range of each quantity, or may be the minimum and maximum values detected during a particular set of calculations. For example, the CIE L*a*b* color space has a larger gamut than RGB color spaces. Therefore, the ranges of the L*, a* and b* values utilized when converting the initial RGB values to L*a*b* values are smaller than the full ranges of the L*, a* and b* values. In this case, if the minimum and maximum values of the full range of each of these quantities were used in equations (1)-(3), some number of integers in the r, s and t ranges would be unused in actual color space conversions. However, where the detected minimum and maximum L*, a* and b* values are used in equations (1)-(3), the ranges of the r, s and t values are more fully utilized.

After calculating the floating point r, s and t values at 106, 108 and 110, method 100 next involves converting the floating point r, s and t values to integers at 112. The floating point r, s and t values may be converted to integers in any suitable manner. For example, the fractional portion of the floating point r, s and t values may simply be truncated to give the r, s and t integers the value of the next-lowest integers. However, in some cases, a floating point r, s and t value may be closer in value to a next-highest integer rather than a next-lowest integer. In this situation, simply truncating the floating point r, s and t values may not create integer r, s and t values that are the best representation of the initial RGB values. Therefore, an optimizing routine may be used to test various combinations of different r, s and t integer values both higher than and lower than the r, s and t floating point values to determine which of the tested integer r, s and t values most closely represent the original RGB values.

The optimization routine of method 110 begins at 114, where a quantity "distance," representing a distance between the initial RGB values and test RGB values that are calculated from the integer r, s and t values, is initialized. Typically, "distance" is given an initial value larger than any expected distances between the initial and the test RGB values, but it may be given any other suitable initial value.

At the time "distance" is initiated at 114, a series of counters are given initial values of zero at 116. The counters initiated at 116 are configured to track changes made to the r, s and t integer values during the optimization portion of method 100. Next, method 110 enters a series of nested loops involving the counters initialized at 116. First, method 110 enters a loop for the "a" counter at 118, then for the "b" counter at 120, and then for the "c" counter at 122. Next, test RGB values are calculated at 123 from the integer r, s and t values. The test RGB values are typically calculated by reversing the calculations performed to generate the floating point r, s and t values. Thus, in the depicted embodiment, the test RGB values would be calculated by first converting the integer r, s and t values into CIE L*a*b* values, then to CIE XYZ values, and then to RGB values.

Next, a distance between the test RGB values and the initial RGB values in the RGB color space is calculated at 124. This distance may be calculated in any suitable manner. For example, because the three axes in the RGB color space are orthogonal to one another, the Pythagorean theorem may be used to calculate this distance. This may be expressed by the following equation:

$$\text{distance}^2 = (R_{initial} - R_{test})^2 + (G_{initial} - G_{test})^2 + (B_{initial} - B_{test})^2 \quad (4)$$

After determining the distance between the initial RGB values and the test RGB values, the calculated distance is compared, at 125, to the value "distance." If the calculated distance is less than the value of the quantity "distance," then the quantity "distance" is assigned the value of the calculated distance at 126, and the integer values of r, s and t from which the test RGB values were calculated are saved at 128 as corresponding to the initial RGB values from which they were calculated. If, however, the calculated distance is not less than "distance," then "distance" is not reset and the integer values of r, s, and t are not saved.

Next, it is determined at 130 whether the loop counter c is equal to one. If not, then at 132 the t integer value is increased by one and the c counter is increased by one. Method 100 then loops back to 122, where new test RGB values are calculated and compared to the initial RGB values.

If, on the other hand, the c counter is equal to one, then it is determined at 134 whether the loop counter b is equal to one. If not, then the counter b and the integer value t are both increased by one at 136, and method 100 loops back to 120, new test RGB values are again calculated and compared to initial RGB values. If, however, the b counter is equal to one, then it is determined at 138 whether the a counter is equal to one. If not, then both the counter a and the integer r value are increased by one, and method 100 loops back to 118 to again calculate test RGB values and to determine the distance between the initial and test RGB values. In this manner, a plurality integer r, s and t values that are both greater than and less than the floating point r, s and t values can be compared in a variety of combinations to the initial RGB values to determine which combination of integer r, s and t values tested give the most accurate reproduction of RGB values. The combination of tested integer r, s and t values that most closely reproduce the initial RGB values may then be stored in the look-up table for future RGB to r, s, t conversions.

It will be appreciated that the optimization routine set forth above is merely exemplary, and any other suitable routine may be used to determine a combination of r, s and t integers that most closely reproduces the initial RGB values. For example, the b counter may be re-initialized to 0 within the a=0 to 1 loop (after step 116 and before step 118), and/or the c counter may be re-initialized within the b=0 to 1 loop (after step 118 and before step 120).

Once the combination of integer r, s and t values that most closely reproduces the initial RGB values is saved in the look-up table, it may be desirable to verify at 142 that the integer r, s and t values saved in the look-up table are each within a permissible range of values. If any values are not within the permissible ranges, the values may be set at 144 to have the value of the closest permissible value. For example, if the value r has a range of 0-63 and the integer value r stored in the look-up table is 64, then the stored r value may be reset to 63. After verifying that the integer r, s and t values are within permissible ranges (or resetting the values to be within the permissible ranges), method 100 may be performed for the next desired set of values in the first color space.

Thus, as described above, one embodiment provides a method of processing image data, wherein the method includes receiving a set of image data values in a device-dependent first color space, comparing the values in the first color space to a look-up table having entries correlating the values in the first color space to integer values in a device-independent second color space, locating in the look-up table the values in the second color space corresponding to the values in the first color space, and converting the values in the first color space to the values in the second color space.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of processing image data using an image source computer via a look-up table, comprising:
   receiving a set of image data values in a first color space using the image source computer, wherein the first color space is device-dependent;
   generating entries for the look-up table using the image source computer, wherein the look-up table includes entries correlating the values in the first color space to integer values in a device-independent second color space, and wherein the generating includes comparing at least two sets of integer representations in the second color space to the values in the first color space by calculating two sets of test values in the first color space from the two sets of integer representations in the second color space and comparing the test values to the values in the first color space;
   comparing the values in the first color space to the look-up table using the image source computer;
   locating in the look-up table the values in the second color space corresponding to the values in the first color space using the image source computer; and
   converting the values in the first color space to the values in the second color space using the image source computer.

2. The method of claim 1, wherein generating the look-up table entries includes calculating floating point representations of values in the second color space from the values in the first color space, and converting the floating point representations of the values in the second color space to integers.

3. The method of claim 2, wherein calculating floating point representations of the values in the second color space from the values in the first color space includes converting the values in the first color space to an intermediate color space to form intermediate color space values, offsetting each intermediate color space value to form offset values, and then multiplying each offset value by a scaling factor.

4. The method of claim 3, wherein the intermediate color space is a CIE L*a*b* color space in which the intermediate color space values include an L value, an A value, and a B value, and wherein offsetting the intermediate color space coordinates includes subtracting a minimum L value from the L value, subtracting a minimum A value from the A value, and subtracting a minimum B value from the B value.

5. The method of claim 3, wherein the intermediate color space is a CIE L*a*b* color space having an L coordinate, wherein the second color space values include a first coordinate, and wherein the scaling factor for the L value is formed by dividing a total size of a range of the first coordinate by a total size of a range of the L coordinate.

6. A method of processing image data using an image source computer via a look-up table, comprising:
   receiving a set of image data values in a first color space using the image source computer, wherein the first color space is device-dependent;
   generating entries for the look-up table using the image source computer, wherein the look-up table includes entries correlating the values in the first color space to integer values in a device-independent second color space, and wherein the generating includes:
   calculating floating point representations of values in the second color space from the values in the first color space using the image source computer,
   calculating from the floating point representations of the values in the second color space a first set of integer representations of the values in the second color space and a second set of integer representations of the values in the second color space using the image source computer, wherein the first set of integer representations is different from the second set of integer representations, and
   comparing the first set of integer representations and the second set of integer representations to the values in the first color space by converting the first set of integer representations to the first color space to form first test values using the image source computer, and converting the second set of integer representations to the first color space to form second test values using the image source computer, and comparing the first test values and the second test values to the values in the first color space using the image source computer to determine whether the first set of integer representations or the second set of integer representations is closer to the values in the first color space;

comparing the values in the first color space to the look-up table using the image source computer;

locating in the look-up table the values in the second color space corresponding to the values in the first color space using the image source computer; and converting the values in the first color space to the values in the second color space using the image source computer.

7. The method of claim 6, wherein the second set of integer representations is formed by adding a value of one to at least one integer of the first set of integer representations.

8. The method of claim 6, wherein comparing the first test values to the values in the first color space includes calculating a distance between the first test values and the values in the first color space.

9. The method of claim 6, wherein comparing the second test values to the values in the first color space includes calculating a distance between the second test values and the values in the first color space.

10. The method of claim 6, further comprising storing as the entries in the look-up table integer representations of the first integer representations and the second integer representations that is closest to the values in the first color space.

11. The method of claim 6, wherein the first color space is a RGB color space, and wherein the second color space is related to a CIE L*a*b* color space.

12. A method of converting image data from a first color space to a second color space using an image source computer, the image data containing a plurality of first color space values, the method comprising:

comparing the first color space values to a look-up table having entries correlating the first color space values to corresponding second color space values using the image source computer, wherein the look-up table entries are generated by:

calculating floating point representations of the second color space values from the first color space values using the image source computer; and converting the floating point representations of the second color space values to integers to form the second color space values using the image source computer;

wherein converting the floating point representations of the second color space values to integers includes calculating from the floating point representations of the second color space values at least two different sets of integer representations of the second color space values, and comparing a first set of integer representations and a second set of integer representations to the first color space values by converting the first set of integer representations to the first color space to form first test values, and converting the second set of integer representations to the first color space to form second test values, and comparing the first test values and the second test values to the first color space values to determine which set of integer representations in the second color space is closer to the first color space values;

locating in the look-up table the second color space values corresponding to the first color space values using the image source computer; and converting the first color space values to the corresponding second color space values using the image source computer.

13. The method of claim 12, wherein the second set of integer representations is formed by adding a value of one to at least one integer of the first set of integer representations.

14. The method of claim 12, wherein comparing the first test values to the first color space values includes calculating a distance between the first test values and the first color space values.

15. The method of claim 12, wherein comparing the second test values to the first color space values includes calculating a distance between the second test values and the first color space values.

16. The method of claim 12, further comprising storing as the entries in the look-up table integer representations of the first integer representations and the second integer representations that is closest to the first color space values using the image source computer.

17. The method of claim 12, wherein calculating floating point representations of the second color space values from the first color space values includes scaling the first color space values.

18. The method of claim 12, wherein the first color space is an RGB color space, and wherein the second color space is related to the CIE L*a*b* color space.

19. A method of transforming CIE L*a*b* color space coordinates to color space coordinates in a second color space that facilitate image data compression using an image source computer, the method comprising:

scaling the CIE L*a*b* color space coordinates to form color space coordinates in the second color space using the image source computer, wherein the color space coordinates in the second color space are floating point numbers, and wherein the scaling includes offsetting each of an L coordinate, an A coordinate, and a B coordinate of the CIE L*a*b* color space to foam an offset L coordinate, an offset A coordinate, and an offset B coordinate and then multiplying each of the offset L, A, and B coordinates by a corresponding scaling factor, the scaling factor for the offset L coordinate being formed by dividing a total size of a range of a first coordinate in the second color space by a total size of a range of the L coordinate;

converting the color space coordinates in the second color space to integers using the image source computer; and storing the integers of the color space coordinates in the second color space in a look-up table using the image source computer, the look-up table including entries correlating values in a first device-dependent color space to values in the second color space.

20. The method of claim 19, wherein offsetting the CIE L*a*b* color space coordinates includes subtracting a minimum L value from the L coordinate, subtracting a minimum A value from the A coordinate, and subtracting a minimum B value from the B coordinate.

21. The method of claim 19, wherein the second color space includes the first coordinate, a second coordinate, and a third coordinate.

22. The method of claim 19, wherein converting the scaled color space coordinates to integers includes truncating each scaled color space coordinate to remove a fractional portion of each scaled color space coordinate.

23. The method of claim 22, wherein the CIE L*a*b* color space coordinates are calculated from an initial set of RGB color space coordinates, further comprising converting the integers to an RGB color space to form first test values, and comparing the first test values to the initial set of RGB color space coordinates.

24. A method of transforming CIE L*a*b* color space coordinates to color space coordinates in a second color space that facilitate image data compression using an image source computer, the method comprising:

scaling the CIE L*a*b* color space coordinates to form color space coordinates in the second color space using the image source computer, wherein the color space coordinates in the second color space are floating point numbers, and wherein the scaling includes offsetting each of an L coordinate, an A coordinate, and a B coordinate of the CIE L*a*b* color space to form an offset L coordinate, an offset A coordinate, and an offset B coordinate and then multiplying each of the offset L, A, and B coordinates by a corresponding scaling factor, the scaling factor for the offset L coordinate being formed by dividing a total size of a range of a first coordinate in the second color space by a total size of a range of the L coordinate, and wherein the CIE L*a*b* color space coordinates are calculated from an initial set of RGB color space coordinates;

converting the color space coordinates in the second color space to integers using the image source computer;

converting the integers to an RGB color space to form first test values using the image source computer;

increasing at least one of the integers by a value of one to form modified integers using the image source computer;

converting the modified integers to the RGB color space to form second test values using the image source computer;

comparing the first test values and the second test values to the initial set of RGB color space coordinates using the image source computer to determine which of the first and second test values is closest to the initial set of RGB color space coordinates; and storing the integers of the color space coordinates in the second color space in a look-up table using the image source computer, the look-up table including entries correlating values in an RGB color space to values in the second color space.

25. The method of claim 24, further comprising converting the CIE L*a*b* color space coordinates to whichever of the integers and the modified integers is closest to the initial set of RGB color space coordinates.

26. A method of converting image data from a first color space to a second color space using an image source computer, the image data containing a plurality of first color space values, the method comprising:

comparing the first color space values to a look-up table for converting data from the first color space to the second color space using the image source computer, wherein the look-up table includes entries correlating the first color space values to corresponding second color space values, and wherein the look-up table entries were generated by:

calculating floating point representations of the second color space values from the first color space values using the image source computer;

changing the floating point representations of the second color space values to integer representations of the second color space values using the image source computer;

converting the integer representations of the second color space values to the first color space to form first test values using the image source computer;

comparing the first test values to the first color space values using the image source computer to determine a first test result;

modifying the integer representations of the second color space values to form modified integer representations of the second color space values using the image source computer;

converting the modified integer representations of the second color space values to the first color space to form second test values using the image source computer;

comparing the second test values to the first color space values using the image source computer to determine a second test result;

comparing the first test result to the second test result to determine which of the first test values and second test values is less distant from the first color space values using the image source computer;

storing the integer representations of the second color space values as the entries in the look-up table when the first test values are less distant from the first color space values than the second test values using the image source computer; and storing the modified integer representations of the second color space values as the entries in the look-up table using the image source computer, when the second test values are less distant from the first color space values than the first test values.

27. A non-transitory computer-readable memory device storing a code segment containing a set of instructions executable by a computing device to:

receive a set of image data values in a first color space, wherein the values in the first color space are digital values in floating point format;

compare the values in the first color space to a look-up table, wherein the look-up table includes entries correlating the values in the first color space to values in a second color space, and wherein the values in the second color space are digital values in integer format, and wherein the instructions are executable to construct the look-up table by calculating floating point representations of values in the second color space from the values in the first color space, converting the floating point representations of the values in the second color space to integers in the second color space, and comparing at least a first set of test values in the first color space, generated from the integers in the second color space, to the set of image data values in the first color space;

locate in the look-up table the values in the second color space corresponding to the values in the first color space; and convert the values in the first color space to the values in the second color space wherein calculating floating point representations of the values in the second color space from the values in the first color space includes converting the values in the first color space to an intermediate color space to form intermediate color space values, offsetting each intermediate color space value to form offset values, and then multiplying each offset value by a scaling factor; and wherein the intermediate color space is a CIE L*a*b* color space having an L coordinate, an A coordinate, and a B coordinate, wherein the second color space values include a first coordinate, a second coordinate and a third coordinate, and wherein the scaling factor for the L value is formed by dividing a total size of a range of the first coordinate by a total size of a range of the L coordinate.

28. A non-transitory computer-readable memory device storing a code segment containing a set of instructions executable by a computing device to:

receive a set of image data values in a first color space, wherein the values in the first color space are digital values in floating point format;

compare the values in the first color space to a look-up table, wherein the look-up table includes entries correlating the values in the first color space to values in a second color space, and wherein the values in the second color space are digital values in integer format, and wherein the instructions are executable to construct the look-up table by calculating floating point representations of values in the second color space from the values in the first color space, converting the floating point representations of the values in the second color space to integers in the second color space by:

calculating from the floating point representations of the values in the second color space a first set of integer representations of the values in the second color space and a second set of integer representations of the values in the second color space, wherein the first set of integer representations is different from the second set of integer representations, and comparing the first set of integer representations and the second set of integer representations to the values in the first color space, by converting the first set of integer representations to the first color space to form first test values and converting the second set of integer representations to the first color space to form second test values and comparing the first test values and the second test values to the values in the first color space, to thereby determine whether the first set of integer representations or the second set of integer representations is closer to the values in the first color space;

locate in the look-up table the values in the second color space corresponding to the values in the first color space; and convert the values in the first color space to the values in the second color space.

29. The computer-readable memory device of claim 28, wherein the second set of integer representations is formed by adding a value of one to at least one integer of the first set of integer representations.

30. The computer-readable memory device of claim 28, wherein comparing the first test values to the values in the first color space includes calculating a distance between the first test values and the values in the first color space.

31. The computer-readable memory device of claim 28, wherein comparing the second test values to the values in the first color space includes calculating a distance between the second test values and the values in the first color space.

32. The computer-readable memory device of claim 28, wherein the instructions are executable to store as the entries in the look-up table integer representations of the first integer representations and the second integer representations that is closest to the values in the first color space.

* * * * *